United States Patent Office 3,092,610
Patented June 4, 1963

3,092,610
POLYEPOXY ETHERS OF POLYHYDRIC PHENOLS AND CURED PRODUCTS OBTAINED THEREFROM
Carl G. Schwarzer, Walnut Creek, Calif., assignor to Shell Oil Company, a corporation of Delaware
No Drawing. Filed June 23, 1958, Ser. No. 743,982
10 Claims. (Cl. 260—47)

This invention relates to a new class of epoxy ethers and to their preparation. More particularly, the invention relates to new epoxy ethers of special polyhydric phenols prepared from polycarbonyl-substituted benzenes and to the utilization of these epoxy ethers, particularly in the preparation of high temperature laminates and adhesives.

Specifically, the invention provides new and particularly useful polyepoxy ethers comprising polyethers of epoxy substituted monohydric alcohols and polyhydric phenols having at least four phenolic OH groups obtained by condensing a phenol with a polycarbonyl-substituted benzene. The invention further provides new and particularly useful cured products obtained by reacting the above-described polyepoxy ethers with epoxy curing agents, such as polyamines and polybasic acid anhydrides.

Epoxy resins known heretofore have been largely polyglycidyl ethers of a dihydric phenol, such as bis-phenol A, i.e., 2,2-bis(4-hydroxyphenyl)propane. Although the cured products of these epoxy resins are hard and strong at normal atmospheric temperatures, the hardness and strength of the products are much less at elevated temperatures. Consequently, the usual epoxy resins are not very suitable in applications where the cured product is subjected to conditions of elevated temperatures, such as, for example, in adhesives or laminated products as used in the preparation of jet aircraft or guided missiles.

It is, therefore, an object of the invention to provide a new class of epoxy ethers. It is a further object to provide new epoxy ethers which can be cured to form products having outstanding hardness and strength at elevated temperatures. It is a further object to provide new epoxy ethers which are particularly useful in the preparation of high temperature adhesives and laminated articles. These and other objects of the invention will be apparent from the following detailed description thereof.

It has now been discovered that these and other objects may be accomplished by the new polyepoxy polyethers of the invention which comprise polyethers of epoxy-substituted monohydric alcohols, such as, for example, glycidol, and polyhydric phenols having at least four phenolic OH groups obtained by reacting a phenol with a polycarbonyl-substituted benzene. It has been found that these polyepoxy polyethers possess, particularly because of their unique structure features such as having a center benzene ring surrounded by four or more epoxy-substituted aromatic groups, many unexpected and superior properties as compared to conventional polyepoxy ethers of dihydric phenols. It has been found, for example, that these special epoxy ethers may be cured particularly in the presence of amines or polybasic anhydrides to form insoluble infusible products having outstanding hardness and strength at elevated temperatures. It has been found, for example, that products prepared from these special epoxy ethers have a heat distortion point of at least 255° C. which is 50° C. higher than that of a glycidyl ether of a tetraphenol described in U.S. 2,806,016 which in itself has outstanding heat distortion as compared to conventional epoxy resins. These valuable properties make the new class of polyepoxy ethers extremely useful in applications, such as high temperature adhesives, laminates, and molded articles.

The new polyepoxy ethers of the invention are derived from polyhydric phenols which are readily obtained by condensing a phenol with a polycarbonyl-substituted benzene. This condensation is effected by mixing the phenol and the polycarbonyl-substituted benzene together using a substantial excess of the phenol over the stoichiometric proportions of phenol required for reaction with the polycarbonyl-substituted benzene, saturating the mixture with hydrogen chloride, allowing the mixture to react for several days and removing the unreacted phenol, such as by distillation, for example. Mercaptans, such as ethyl mercaptan, may be added to the reaction mixture to improve the yield.

The tetraphenol prepared from phenol and diacetylbenzene may be illustrated by the following:

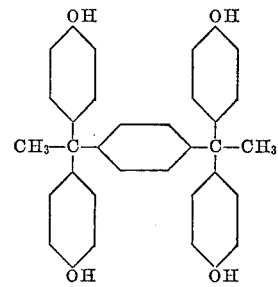

The phenols used in the condensation reaction may be monohydric or polyhydric and may be substituted with other substituents as halogen atoms, alkoxy radicals, hydrocarbyl radicals and the like. Examples of monohydric phenols that may be used in the above process include, among others, phenol, 3-chlorophenol, 3,5-dichlorophenol, 3-ethylphenol, 3,5-diisopropylphenol, 3-methoxyphenol, 3-chloro-5-methoxyphenyl, ortho and meta-cresol, and the like. Particularly preferred are the monohydric phenols containing from 6 to 12 carbon atoms and containing elements of the group consisting of carbon, hydrogen, oxygen and chlorine.

Examples of polyhydric phenols that may be used in the preparation of the above-described polyhydric phenols include, among others, resorcinol, 2,2-bis(4-hydroxyphenyl)propane, 2,2-bis(4-hydroxyphenyl)butane, 1,4-dihydroxy-3-butylbenzene, 1,4-dihydroxy-3-tertiary-butylbenzene, catechol, hydroquinone, methyl resorcinol, 1,5-dihydroxynaphthalene, 4,4'-dihydroxybenzophenone, bis(4-hydroxyphenyl) ethane and the like, and their chlorinated derivatives. Preferred polyhydric phenols to be employed are the di- and trihydric phenols substituted on single aromatic rings or rings that are joined together through an alkylene group, and containing no more than 25 carbon atoms, and preferably no more than 15 carbon atoms.

The polycarbonyl-substituted benzenes used in the condensation reaction to form the new polyhydric penhols are those benzene compounds having at least two keto, i.e., a

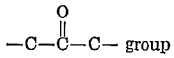 group or an aldehyde, i.e., a

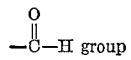 group

Examples of these compounds include, among others, 1,4-diacetylbenzene, 1,3,5-triacetylbenzene, 1,3-diacetylbenzene, 1,4-dicaproylbenzene, 1,3-dicaprylbenzene, 1,4-dibutrylbenzene, 1,4-dilaurylbenzene, 1,4-diformylbenzene, 1,3,5-triformylbenzene and 1,4-di(3-formylpropyl)benzene. Particularly preferred are the di- and tri-keto and aldehydebenzenes containing no more than 20 carbon atoms, and especially those of the formula

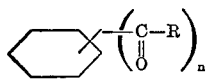

wherein n is 2 or 3 and R is hydrogen or an alkyl radical containing from 1 to 12 carbon atoms.

The preparation of the tetraphenol by the reaction of phenol with diacetylbenzene is illustrated below:

*Alpha,alpha,alpha',alpha'-tetrakis(hydroxyphenyl)-1,4-diethylbenzene.*—100 parts (.616 mols) diacetylbenzene and 1160 parts (12.3 mols) of phenol were introduced into a stirred glass kettle and warmed until a homogeneous solution was obtained. The contents were cooled to 130° C. and 6 parts (.097 mols) of ethyl mercaptan was added. Anhydrous gaseous HCl was bubbled into the solution until it became saturated. After allowing to stand, the solution was then heated to reflux and held at this point (140° C.) for about 5 hours. Excess phenol was removed by distillation at 150° C. at 5 mm. The residual product was treated with steam to remove the remaining traces of phenol. The tetraphenol was recovered by filtering a hot water suspension of the product. This was dried at 70° C. (20 mm.) The crude product was recrystallized from an ethanol-methylethyl ketone solution. The resulting product was a white crystaline solid melting at 282–285° C. Analysis indicated the product was the above noted alpha,alpha,alpha',alpha'-tetrakis(hydroxphenyl)-1,4-diethyl benzene.

The epoxy-substituted alcohols, the novel ethers of which are provided by the present invention, comprise those monohydric alcohols possessing at least one epoxy group, i.e., a

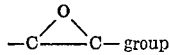

Examples of these alcohols include 2,3-epoxypropanol (glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-5-propanol, 2,3-dimethyl-4,5-epoxyoctanol, 2-methoxy-4,5-epoxyoctanol, 3,4-epoxy-5-chlorocyclohexanol, 2,3-epoxypropoxypropanol, 2,3-epoxypropoxypropanol, 2,3-epoxypropoxyhexanol, 2,3-epoxypropoxy-2,3-dihydroxyheptanol, 2,3-epoxydodecanol and 4-chloro-5,6-epoxydodecanol.

Preferred epoxy-substituted alcohols are the epoxy-substituted aliphatic and cycloaliphatic monohydric alcohols containing from 3 to 15 carbon atoms, such as 2,3-epoxypropanol, 3,4-epoxybutanol, 3,4-epoxydodecanol, 2-methyl-2,3-epoxypropanol, 2,3-epoxycyclohexanol, 2,3-epoxypropoxyethanol, 2,3-epoxypropoxyoctanol, and the like.

Particularly preferred epoxy-substituted alcohols are the epoxyalkanols, epoxyalkoxyalkanol, epoxycycloalkanols and epoxyalkoxycycloalkanols, and particularly those containing not more than 12 carbon atoms, such as 2,3-epoxypropanol, 3,4-epoxyhexanol, 2,3-epoxypropoxyoctanol, 2,3-epoxy-5-octanol, 2,3-epoxy-6-dodecanol, 2,3-epoxypropoxy-5-octenol, 3,4-epoxycyclohexanol, 2,3-epoxypropoxy-4-cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the ease of preparation of their ethers as well as the superior properties possessed by such esters.

The ethers may be obtained by various methods. The epoxy ethers of the above-described polyhydric phenols are preferably obtained by reacting the phenol with an epoxy-halo-substituted alkane or a dihalo-hydroxy-substituted alkane in an alkaline medium.

The expression "halo-epoxy-substituted alkanes" as used herein refers to those alkanes having a 1,2-epoxy group, i.e., a

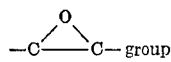

attached directly to a halogen-bearing carbon atom, such as, for example, epichlorohydrin, epibromohydrin, 1,4-dichloro-2,3-epoxybutane, 1-chloro-2,3-epoxypentane, and the like. The expression "dihalo-hydroxy-substituted alkanes," as used herein, refers to those alkanes having a series of three carbon atoms, one of which is attached to a halogen atom, the next is attached to a hydroxyl group and the last is attached to a halogen atom, such as, for example, 1,3-dichloro-2-hydroxypropane, 2,4-dibromo-3-hydroxypentane, 2,3-dichloro-3-hydroxybutane, and the like. Epichlorohydrin comes under special consideration because of its low cost and because of the superior properties of the epoxides obtained therefrom.

The polyglycidyl ethers of the invention may be prepared by adding the polyphenol to epichlorohydrin using the latter in a ratio of about 2 to 20 molecules of epichlorohydrin per phenolic hydroxyl group of the phenol, and then adding an alkali metal hydroxide such as sodium or potassium hydroxide so as to effect the desired etherification reaction. It is convenient to dissolve the polyphenol in the substantial stoichiometric excess of epichlorohydrin and heat the mixture to about reflux temperature. Aqueous sodium hydroxide, such as about a 15% to 50% solution, is then added gradually with boiling of the reaction mixture. The water added with the caustic and formed in the reaction is removed by distillation azeotropically with epichlorohydrin. Condensed distillate separates into an upper aqueous phase and a lower epichlorohydrin phase, which latter phase is returned as reflux. It is desirable to add the caustic and conduct the distillation at rates so that the reaction mixture contains at least about 0.5% water in order to have the etherification reactions progress at a reasonably rapid rate. The sodium hydroxide is added in amount that is equivalent on stoichiometric basis to the quantity of starting tetraphenol, or small excess thereof such as 3% to 5%. Upon completion of the caustic addition and the etherification reactions, unreacted epichlorohydrin is separated by distillation. The residue consisting primarily of the polyglycidyl ether and salt has added thereto a mixture of equal volumes of toluene and butanone. This solvent mixture dissolves the ether, but not the salt which is removed by filtration. The filtrate is then distilled to separate the solvent and leave the desired polyglycidyl ether.

The polyglycidyl ether of the polyhydric phenols of the invention are generally solid epoxy resins at 25° C. and have more than one of the hydrogen atoms of the phenolic hydroxyl groups of the polyhydric replaced by an epoxy-substituted radical in the average molecule. Usually, the average molecule contains about 3 to 4 epoxy-substituted radicals. Other groups in the ether besides a possible very small amount of unetherified phenolic hydroxyl groups, are dihydroxyl glyceryl radicals and chlorohydroxy radicals which likewise are substituted in place of hydrogen atoms of phenolic hydroxyl groups of the initial polyhydric phenol. The polyglycidyl ether of the invention is soluble in lower aliphatic ketones as well as in mixtures of an aromatic hydrocarbon containing a substantial proportion of such lower ketone.

As stated hereinbefore, the new epoxy resins of the invention are very useful materials. The polyepoxy materials may be polymerized through the epoxy group to form valuable polymeric products having outstanding hardness and heat resistance. In this capacity, they may be polymerized alone or with other polyepoxide materials in a variety of different proportions, such as, for example, with amounts of other polyepoxides varying from 5% to 98% by weight. Polyepoxides that may be copolymerized with these new polyepoxides include, among others, glycidyl polyethers of polyhydric phenols obtained by reacting polyhydric phenols, such as bisphenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyethers of polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and copolymerization. Such agents include, among others, carboxylic acids or anhydrides, such as oxalic acid, phthalic anhydride; Friedel-Crafts metal halides, such as aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetramine, dicyandiamide, melamine; and salts of inorganic acids, such as zinc fluoborate, potassium persulfate, nickel fluoborate, copper fluoborate, selenium fluoborate, magnesium fluoborate, tin fluoborate, potassium magnesium arsenate, magnesium sulfate, cadmium arsenate, cadmium silicate, aluminum fluoborate, ferrous sulfate, ferrous silicate, manganese hypophosphite, nickel phosphate and nickel chlorate.

The amount of the curing agents employed may vary over a considerable range depending upon the agent selected. With curing agents having replaceable hydrogen, such as the amine agents, amounts of agent employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the material being polymerized. With the phosphoric acid and esters, particularly preferred amounts vary from about 3% to 20% by weight. The other curing agents are preferably employed in amounts varying from 1% to 20%.

In using the polyglycidyl ethers in various applications, they may be mixed with one or more of a variety of other materials such as fillers, solvents including monoepoxy compounds, pigments, plasticizers, and different resins such as phenolic resins, urea resins and melamine resins.

*Example I*

This example illustrates the preparation and some of the properties of tetraglycidyl ether of alpha,alpha,alpha'-alpha'-tetrakis(hydroxyphenyl) - 1,4 - diethyl benzene.

Alpha,alpha,alpha'-alpha'-tetrakis(hydroxyphenyl)-1,4-diethyl benzene is dissolved in a 14:1 molar excess of epichlorohydrin and about 2.3% by weight of water is added. This solution is heated vigorously with stirring and the kettle temperature is adjusted to 100° C. at total reflux by adding additional water. After the kettle temperature has been adjusted, 2% molar excess of sodium hydroxide based upon the tetraphenol is added as a 46% aqueous solution. The caustic solution is added over a 2 hour period. During this period, the kettle temperature is maintained to dryness after all the caustic solution has been added. The solution is filtered to remove salt formed during the reaction and the filtrate is distilled to remove the excess epichlorohydrin. This distillation is taken to a kettle temperature of 150 to 170° C. at 1–2 millimeters to insure complete removal of epichlorohydrin and other volatile products. The resulting product is a white solid having an epoxy value of 0.463 eq./100 g., hydroxy value of .09 eq./100 g., chlorine, 1.77% by weight, molecular weight of 675.

100 parts of the above-described tetraglycidyl ether is combined with 13.5 parts of 2,6-diamino pyridine and the mixture heated at 160° C. The heat distortion point of the casting is 255° C. This is about 50° higher than the heat distortion point of the tetraglycidyl ether of 1,1,2,2,-tetrakis(hydroxyphenyl)ethane, as disclosed in U.S. Patent 2,806,016. The casting prepared from the above-described tetraglycidyl ether also had excellent resistance to water and solvents, such as acetone. The weight change in 3 hours with boiling water was a net gain of 0.09 with a Barcol hardness of 51 and the weight change in 3 hours of boiling acetone was 0.09 with a Barcol hardness of 53.

Related results are obtained by replacing the 2,6-diaminopyridine curing agent with an equivalent amount of tetrahydrophthalic anhydride and with an equivalent amount of meta-phenylene diamine.

*Example II*

A glass cloth laminate was prepared using the tetraglycidyl ether prepared in Example I. An acetone solution containing 60% by weight of the tetraglycidyl ether was prepared. A catalyst solution prepared by dissolving 13.5 parts of 2,6-diamino pyridine in 33.3 parts of water and 50 parts of acetone was added to the ether solution so that there was present an added 13.5 parts of the curing agent based upon the ether. A strip of 181 Volan A glass cloth was passed through the solution and dried for 10 minutes at about 90° C. The strip was cut in pieces and 6 plies were stacked together. The assembly was incased in cellophane and placed in a heated press having a temperature of about 175° C. The press platens were brought into contact pressure at about 3 p.s.i. for 1 minute and then the pressure was increased to 25 p.s.i. for 9 minutes. The product was a strong laminate having good heat resistance.

*Example III*

The polyglycidyl ether of alpha,alpha,alpha',alpha'-tetrakis(hydroxyphenyl)-1,4-dibutyl benzene is prepared by the same procedure as outlined in Example I. The resulting product is a light colored solid having an epoxy value of about 0.5 eq./100 g.

A glass cloth laminate was prepared as described in Example II, except that this polyglycidyl ether was used. The resulting laminate retained excellent hardness at elevated temperatures and had good resistance to boiling water and acetone.

*Example IV*

This example illustrates the preparation and some of the properties of a polyglycidyl ether of alpha,alpha,alpha',alpha,alpha'',alpha''-hexa(hydroxyphenyl) - 1,3,5-triethylbenzene.

The above-described polyhydric phenol is dissolved in a 14:1 molar excess of epichlorohydrin and about 2.3% by weight of water is added. The solution is heated vigorously with stirring and the kettle temperature is adjusted to 100° C. at total reflux by adding additional water. After the kettle temperature has been adjusted, 2% molar excess of sodium hydroxide based upon the polyhydric phenol is added as a 46% aqueous solution. The caustic solution is added over a 2 hour period. During this period, the kettle temperature is maintained at 100° C. by removing water periodically. The system is azeotroped to dryness after all the caustic solution has been added. The solution is filtered to remove salt formed during the reaction and the filtrate is distilled to remove the excess epichlorohydrin and other volatile products.

The resulting product is a white solid having an epoxy value of .482 eq./100 g.

100 parts of the above-described polyglycidyl ether is combined with 20 parts of 2,6-diamino pyridine and the mixture heated at 160° C. The resulting product is a hard tough casting having excellent heat resistance. A glass cloth laminate prepared from the polyglycidyl ether by the method shown in Example II also has excellent heat resistance and good strength.

Related results are obtained by replacing the 2,6-diamino pyridine with equivalent amounts of each of the following: pyromelletic dianhydride, meta-phenylene diamine and methylene dianiline.

*Example V*

This example illustrates the preparation and some of the properties of a polyglycidyl ether of alpha-alpha, alpha',alpha' - tetrakis(hydroxyphenyl)-1 - 4 - dimethylbenzene.

Alpha,alpha,alpha',alpha'-tetrakis(hydroxyphenyl)-1,4-dimethylbenzene (obtained by reacting 1,4-diformylbenzene with phenol) is dissolved in a 14:1 molar excess of epichlorohydrin and about 2.3% by weight of water is added. This solution is heated and the kettle temperature adjusted to 100° C. at total reflux by adding additional water. 2% molar excess of sodium hydroxide based upon the polyhydric phenol is added as a 46% aqueous solution over a period of about 2 hours. During this period, the kettle temperature is maintained at 100° C. by removing water periodically. The system is azeotroped to dryness after all the caustic solution has been added. The solution is filtered to remove salt formed during the reaction and the filtrate distilled to remove the excess epichlorohydrin and other volatile products. The resulting product is a white solid polyglycidyl ether identified as a polyglycidyl ether of alpha, alpha,alpha',alpha' - tetrakis(hydroxyphenyl)-1,4-dimethylbenzene.

The cure of 100 parts of the above-described glycidyl ether with 2,6-diaminopyridine as in Example I gives a product having outstanding heat distortion point as the product shown in Example I. A glass cloth laminate prepared from this polyglycidyl ether as in Example II is very strong and has excellent heat resistance.

*Example VI*

Related results are obtained by replacing the polyhydric phenol in Example I with a polyhydric phenol obtained by condensing 1,4-diacetyl benzene with resorcinol.

*Example VII*

Related results are also obtained by replacing the polyhydric phenol in Example I with a polyhydric phenol obtained by condensing 1,4-diacetylbenzene with ortho cresol.

I claim as my invention:

1. Ethers of (*a*) phenols of the structure

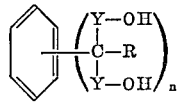

wherein *n* is an integer from 2 to 3, R is a member of the group consisting of hydrogen and alkyl radicals containing from 1 to 12 carbon atoms, and Y is a phenylene radical, and (*b*) vic-epoxy substituted monohydric alcohols, said etherification taking place between the hydroxyl groups on the —YOH radicals and the OH group of the vic-epoxy-substituted monohydric alcohols, with substantially all of the said —YOH groups being so etherified.

2. A polyglycidyl ether of an alpha,alpha,alpha',alpha'-tetrakis(hydroxyaryl)-dialkylbenzene wherein substantially all of the hydroxyl groups on the hydroxyaryl groups are etherified with the glycidyl group.

3. A polyglycidyl ether of alpha,alpha,alpha',alpha'-tetrakis(hydroxyphenyl)-dimethylbenzene wherein substantially all of the hydroxyl groups of the hydroxyphenyl groups are etherified with the glycidyl group.

4. A polyglycidyl ether of alpha,alpha,alpha',alpha'-tetrakis(hydroxyphenyl)-1,4-dibutylbenzene wherein substantially all of the hydroxyl groups on the hydroxyphenyl groups are etherified with the glycidyl group.

5. The tetraglycidyl ether of alpha,alpha,alpha',alpha'-tetrakis(4-hydroxyphenyl)-1,4-diethylbenzene.

6. A polyglycidyl ether of alpha,alpha,alpha',alpha', alpha'',alpha''-hexa(hydroxyphenyl)1,3,5-triethylbenzene.

7. A cured insoluble, infusible product obtained by heating the epoxy ether of claim 1 with an epoxy curing agent of the group consisting of amino compounds, BF$_3$ complexes, polybasic acids and their anhydrides, metal salts of inorganic acids, phosphoric acid and partial esters of phosphoric acid.

8. A polyglycidyl ether of alpha,alpha,alpha',alpha'-tetrakis(polyhydroxyphenyl)-dialkylbenzene wherein substantially all of the hydroxyl groups on the polyhydroxyphenyl groups are etherified with the glycidyl group.

9. An insoluble, infusible product obtained by heating the glycidyl ether of claim 3 with a polyamine.

10. A cured insoluble, infusible product obtained by heating the polyglycidyl ether of claim 5 with a polybasic acid anhydride.

References Cited in the file of this patent

UNITED STATES PATENTS

| | | |
|---|---|---|
| 2,333,548 | Niederle | Nov. 2, 1943 |
| 2,429,556 | Longfellow et al. | Oct. 21, 1947 |
| 2,615,008 | Greenlee | Oct. 21, 1952 |
| 2,668,807 | Greenlee | Feb. 9, 1954 |
| 2,754,335 | Bender et al. | July 10, 1956 |
| 2,806,016 | Schwarzer | Sept. 10, 1957 |
| 2,871,221 | Shepherd et al. | Jan. 27, 1959 |
| 2,938,875 | Martin et al. | May 31, 1960 |

OTHER REFERENCES

McGreal et al.: "J.A.C.S.," pages 345–348 (1939).